No. 12,108. Reissued May 5, 1903.

UNITED STATES PATENT OFFICE.

ALEXANDER CLASSEN, OF AACHEN, GERMANY.

PROCESS OF CONVERTING WOOD INTO SUGAR.

SPECIFICATION forming part of Reissued Letters Patent No. 12,108, dated May 5, 1903.

Original No. 707,903, dated August 26, 1902. Application for reissue filed April 3, 1903. Serial No. 150,934.

*To all whom it may concern:*

Be it known that I, ALEXANDER CLASSEN, a citizen of Germany, residing at Aachen, in the Empire of Germany, have invented certain new and useful Improvements in Processes of Converting Wood into Sugar, of which the following is a full, clear, and exact specification.

In Patent No. 654,518, granted to me, I have described, broadly, a process for converting cellulose into sugar, consisting in heating the material with sulfurous acid and sulfuric acid, the latter being either added as such or produced by the introduction of some oxidant, such as air, a peroxid, or a manganate. If the oxidant, such as air, which is in the vessel or incorporated from material is sufficient to produce the necessary sulfuric acid, then, of course, it will not be necessary to add any more such oxidant; but when such oxidant is introduced from without the operation proceeds best when the oxidant is introduced into the sulfurous acid after the heating has been continued for a certain time, and in order that such oxidant may act satisfactorily there must be sufficient liquid present to diffuse it through the mass in the case of certain oxidants; but where air is used as such oxidant then a proper mixing of the oxidant can be obtained in any desired manner. I do not here of course mean to fully describe the process of my previous patent or intend to limit the application of that process. By my present application of my invention I avoid the inconvenience of introducing an oxidizing agent by using only sufficient solution of sulfurous acid to moisten the sawdust which is used as the source of cellulose—that is, I use such a quantity of the sulfurous-acid solution as will leave a sufficient quantity of air still within the sawdust to effect the production of the sulfuric acid. The sawdust, which generally contains about twenty-five to thirty per cent. of moisture, is mixed with about thirty to thirty-five percent. of its weight of sulfurous-acid solution and is heated in a closed vessel at 120° to 145° centigrade for a period of thirty to sixty minutes. It will be understood, of course, that the proportions of materials used and the periods consumed in the various actions will vary according to conditions—as, for example, according to the nature of the sawdust used and its condition as to humidity. The figures I have used are simply those which are suggested by ordinary experience under the most commonly-prevailing conditions. At the end of the period the excess of sulfurous acid is allowed to blow off, and the mass is lixiviated with water to produce a sugar solution. The said proportion of sulfurous-acid solution is only sufficient to moisten the sawdust, so that the air mixed with the latter is not displaced by the liquid and is therefore able to effect the oxidation produced in the previous process by the introduction of an oxidant. I find that under many conditions the air thus remaining in and about the sawdust in the closed vessel into which such sawdust and sulfurous acid and air are placed is sufficient to produce the necessary amount of sulfuric acid to effect the conversion. Moreover, my new process by avoiding the necessity referred to above for much liquid in the case of certain oxidants enables me to produce a stronger solution.

In Patent No. 654,518, as in this patent, I have not dwelt very fully on the details or the various conditions under which either process can be carried out, for the reason that I understand that these specifications are addressed to persons highly skilled in the art.

Having thus fully described my invention, what I claim as new, and desire to secure by Letters Patent, is—

1. A process of converting cellulose into sugar which consists in mixing one hundred parts by weight of the moist material with thirty to thirty-five parts of an aqueous solution of sulfurous acid, heating the mixture in a closed vessel at 120° to 145° centigrade for thirty to sixty minutes, blowing off the free sulfurous acid and finally lixiviating the mass with water.

2. A process of converting cellulose into sugar which consists in mixing the material to be treated, with a solution of sulfurous acid, and a suitable quantity of air, preferably that normally mixed with the sawdust, then heating the mixture in a closed vessel at from approximately 120° to approximately 145° centigrade for from about thirty to sixty minutes, then blowing off the free sulfurous acid and finally lixiviating the mass with water.

ALEXANDER CLASSEN.

Witnesses:
HENRY QUADFLIEG,
ALOYS THONNARD.